J. E. POINTON.
DOUGH MOLDING MACHINE.
APPLICATION FILED SEPT. 27, 1919.

1,345,631.

Patented July 6, 1920.
4 SHEETS—SHEET 1.

Inventor
J. E. Pointon,
By H. R. Kerslake
Attorney

J. E. POINTON.
DOUGH MOLDING MACHINE.
APPLICATION FILED SEPT. 27, 1919.

1,345,631.

Patented July 6, 1920.
4 SHEETS—SHEET 2.

Inventor
J. E. Pointon
By H. R. Kerslake
Attorney

J. E. POINTON.
DOUGH MOLDING MACHINE.
APPLICATION FILED SEPT. 27, 1919.

1,345,631.

Patented July 6, 1920.
4 SHEETS—SHEET 3.

Inventor
J. E. Pointon,
By H. R. Kerslake,
Attorney

J. E. POINTON.
DOUGH MOLDING MACHINE.
APPLICATION FILED SEPT. 27, 1919.

1,345,631.

Patented July 6, 1920.

UNITED STATES PATENT OFFICE.

JOHN EDWARD POINTON, OF PETERBOROUGH, ENGLAND.

DOUGH-MOLDING MACHINE.

1,345,631.      Specification of Letters Patent.      Patented July 6, 1920.

Application filed September 27, 1919. Serial No. 326,708.

*To all whom it may concern:*

Be it known that I, JOHN EDWARD POINTON, a subject of the King of Great Britain and Ireland, residing at Brackley, Park Crescent, Peterborough, in the county of Northants, England, have invented certain new and useful Improvements Relating to Dough-Molding Machines, of which the following is a specification.

This invention relates to dough molding machines of the type with which the molding is effected by the coiling of the dough portions by the action of a rotating spindle.

The object of the invention is to provide a simple and convenient molding machine of the said type capable of simultaneously receiving and operating upon a series of dough portions immediately on their discharge from a dividing or other machine, and delivering the same, after molding, directly on to conveyer trays which may form part of a dough proving apparatus.

Referring to the four accompanying sheets of explanatory drawings:—

The same reference letters in the different views indicate the same or similar parts.

Figure 1:
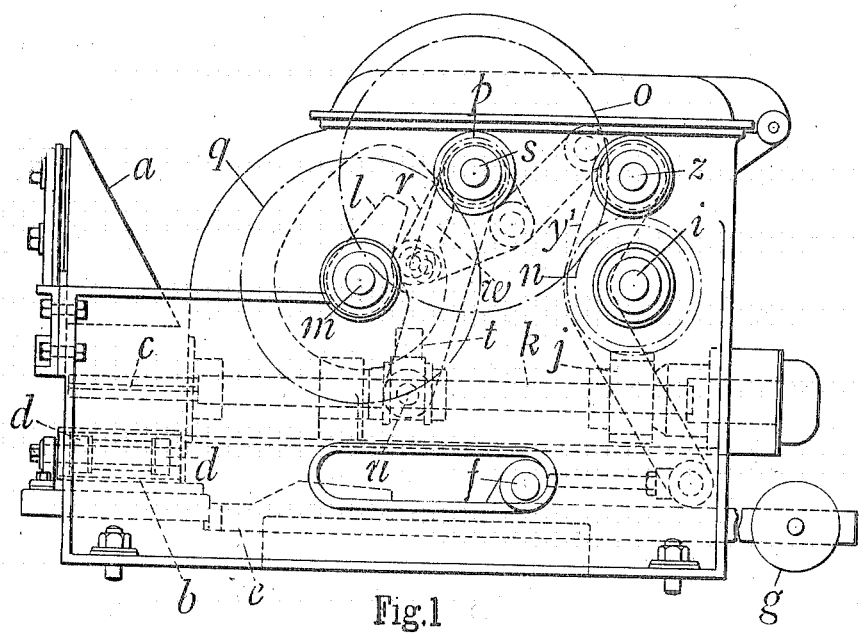
Figure 1 is a side elevation, Fig. 2 a plan (with hinged top cover removed), and Fig. 3 an end elevation of one form of a two spindle machine constructed in accordance with this invention.
Figure 3:
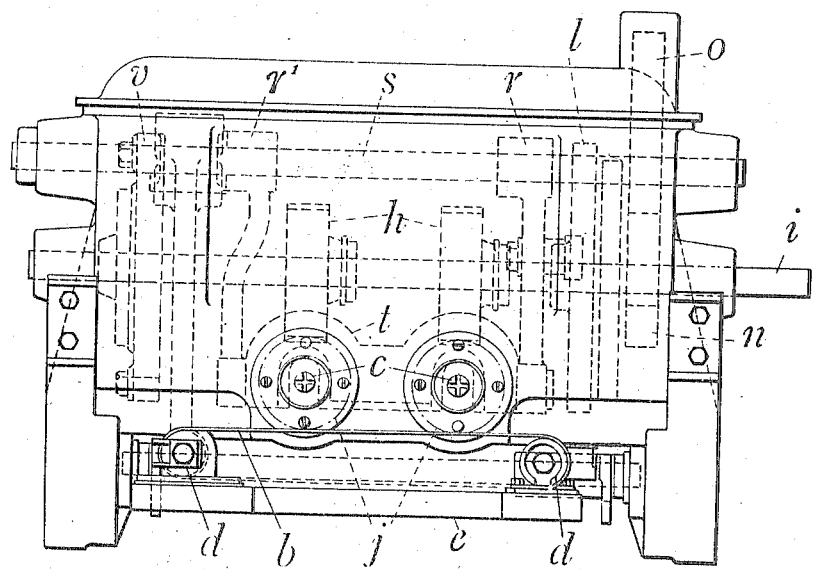
Figure 2:
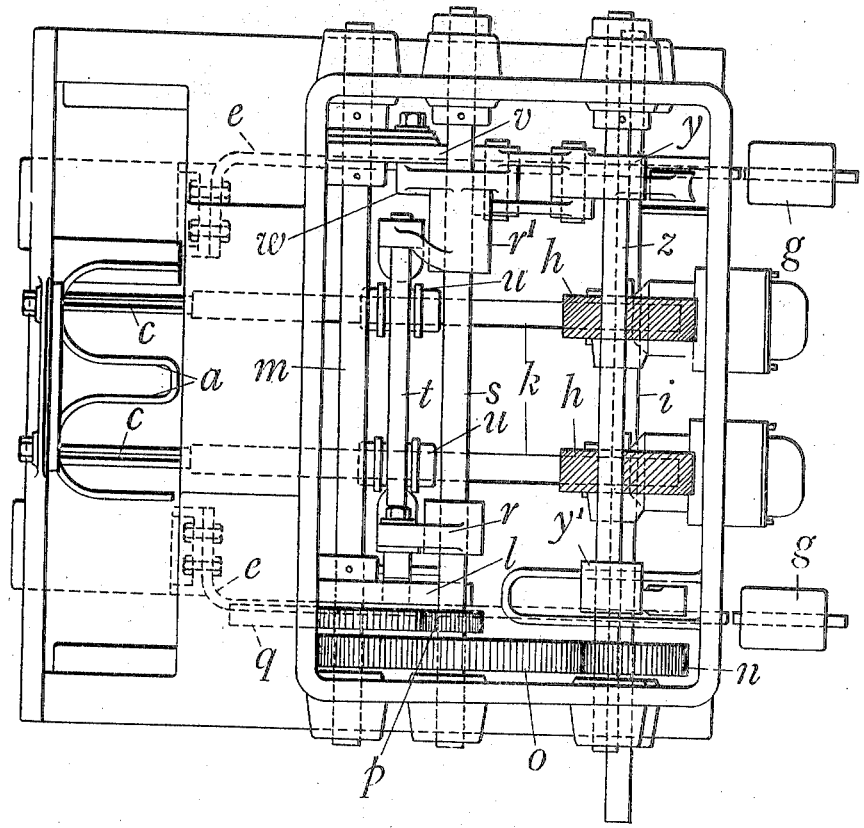

Referring to the machine illustrated by Figs. 1, 2 and 3, the dough portions from the dividing machine pass down the guide chutes or troughs as $a$ (shown at Figs. 1 and 2) on to the upper part of the endless band $b$ (which forms the base of the troughs) and in a suitable position thereon to be engaged by the spindles $c$ and coiled or wound around the same. The endless band $b$ is mounted upon the pulleys $d$ which are free to rotate, and thus as the dough is gradually drawn toward the spindles by the winding action of the latter the band $b$ can travel with it, so avoiding any drag upon the dough such as would occur with a fixed or stationary supporting surface. By the operation of the rotating spindles $c$ the dough lumps or portions are wound or rolled into coils upon the said spindles. To provide for the increasing diameter or growth of the rolls or coils as the dough portions are thus operated upon by the spindles $c$ the band $b$ and its supporting pulleys $d$ are mounted at one end of a sliding frame $e$ which is pivoted at $f$ and has counterweights $g$. The said counter-weights $g$ serve to keep the dough pressed upward or toward the spindles while permitting of the depression of the band $b$ to accommodate the increasing diameter or growth of the dough coils.

The coiling spindles $c$ are rotated through the medium of the skew wheels $h$ on the first motion or driving shaft $i$ which engage or are in gear with the skew pinions $j$, on the spline shafts $k$ forming part of or in attachment with the coiling spindles $c$.

The sliding movements of the spline shafts $k$ to effect the withdrawal of the spindles $c$ from the completely coiled up dough pieces and the subsequent return of the spindles as aforesaid, is obtained by means of a grooved cam $l$ on the shaft $m$, the latter being rotated from the aforesaid drive shaft $i$ through the gear wheels $n, o, p, q$. The cam $l$ engages the lever $r$ of the rock shaft $s$ and as such lever, with its fellow $r'$ is connected to the bridge like member $t$ which engages collars $u$ fixed on the spline shafts $k$, the action of the cam gives the required reciprocatory or sliding movements of the spline shafts and the coiling spindles $c$.

On the said shaft $m$ there is also a cam $v$ which engages a lever $w$ loosely mounted on the fulcrum shaft $s$ to which the aforesaid levers $r$ and $r'$ are fixed. Such lever $w$ is linked to the lever $y$, which with its fellow $y'$ is secured to the rock shaft $z$. The lower ends of such levers $y$ and $y'$ are linked or connected with the aforesaid pivotal sliding frame $e$ carrying the dough supporting band $b$. By the action of the cam $v$ through the levers $y$ and $y'$ the said frame $e$ and band $b$ are moved to the left on the withdrawal of coiling spindles $c$ to the right and thus the coiled up dough portions freed from the spindles are free also for discharge from the machine and for descending on to the shelves or receptacles of the prover which are caused to pass beneath such discharging position of the dough coils. In like manner, on the return of the spindles $c$ to the left under the action of the grooved cam $l$, the dough supporting band $b$ is returned to the right with the sliding frame $e$ under the action of the cam $v$.

Figure 4:
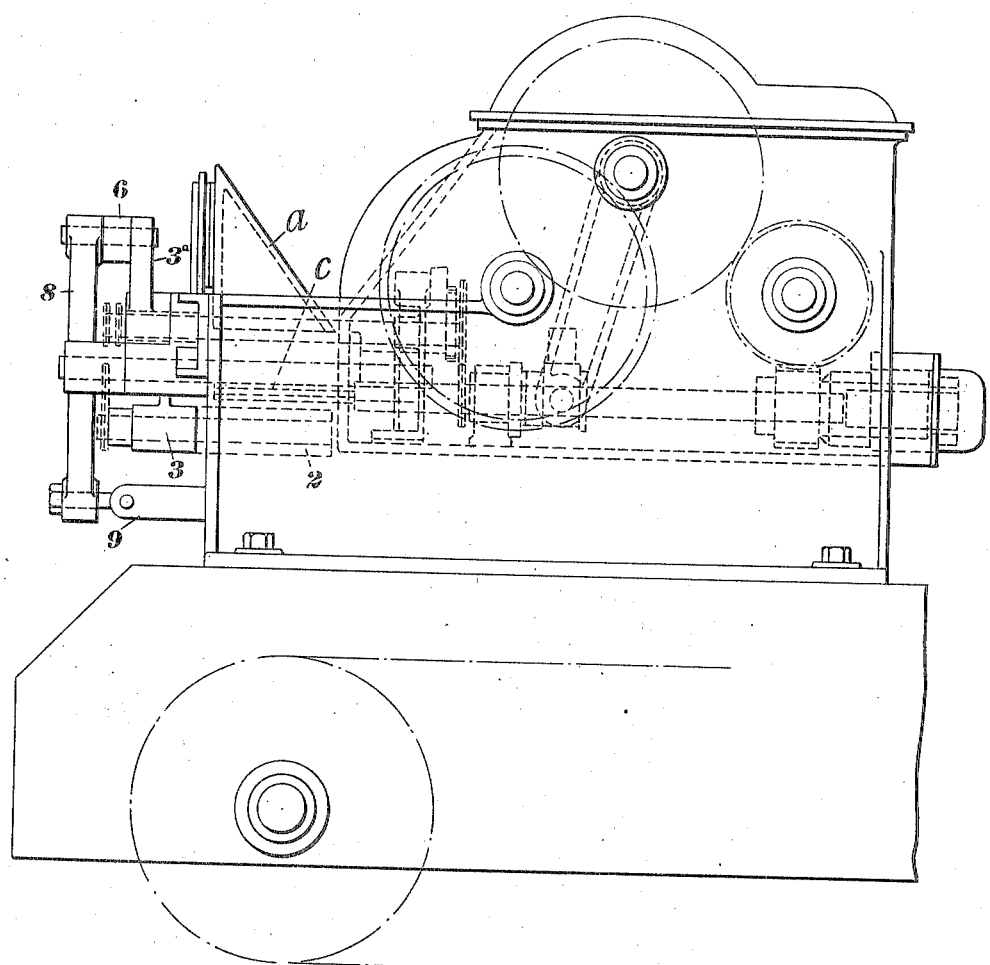
Fig. 4 is a side elevation and Fig. 5 an end elevation of another type of such machine.
Figure 5:
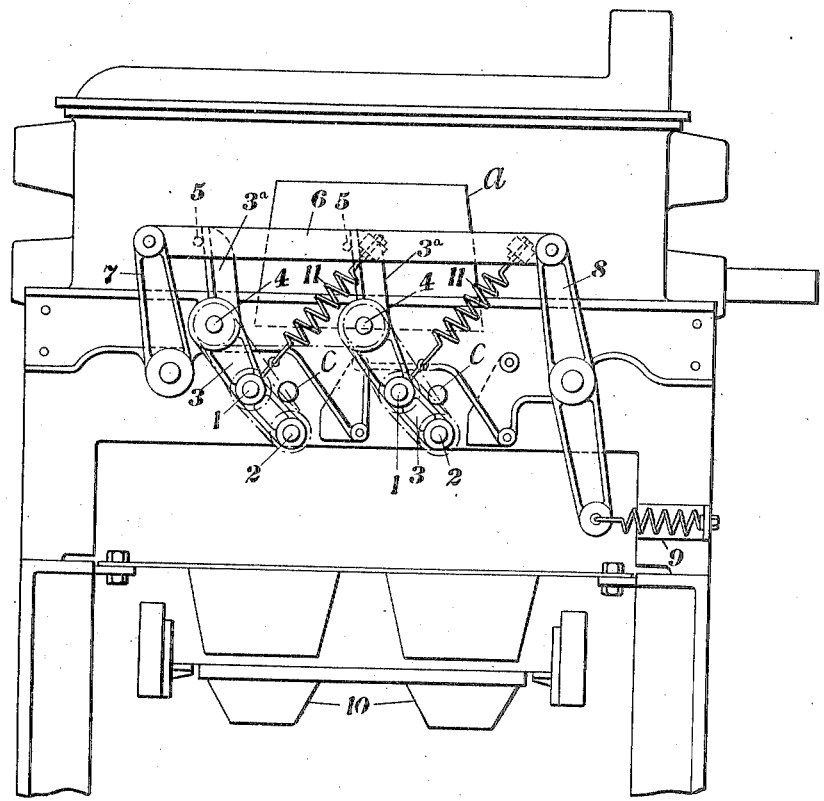

In the machine illustrated at Figs. 4 and 5 the aforesaid dough supporting band $b$ is dispensed with and in place of same a pair of rolls as 1 and 2 are arranged in association with each winding or coiling spindle c. For each such pair of rolls a supporting arm as 3 is employed, each arm being pivotally mounted at its upper end on a spindle 4. The spindles 4 are connected by chain gearing and are positively rotated by a chain drive from one of the coiling spindles c. From such spindles 4 the respective pairs of rolls aforesaid are positively rotated by driving chains. Projections as 3ª from the arms 3 abut against lateral engaging pins as 5 from the link 6 connecting the levers 7 and 8 which are rocked by the action of a cam in association with the spring 9. By such rocking the arms 3, with rolls 1 and 2, are swung aside to permit of the descent of the coiled up dough pieces, (after the withdrawal of the coiling spindles c therefrom) into the shelves as 10 of a dough prover. The springs as 11 serve to draw the rolls 1 and 2 toward the coiling spindles c while providing for the growth or increasing diameter of the coils during the winding or coiling operation.

Having thus described my invention what I claim as new and desire to secure by Letters Patent is:—

1. Machines for the coiling of lumps or unshaped portions of dough without prior sheeting or stretching of the same, comprising coiling spindles, chutes through which the said dough lumps fall freely into engagement with the said spindles, means for maintaining the said engagement during the coiling operation, and means for withdrawing the spindles from the dough, as set forth.

2. Machines for the simultaneous coiling of a series of lumps or unshaped portions of dough without prior sheeting or stretching of the same, comprising a series of coiling spindles, chutes through which the said dough lumps fall freely into engagement with the said spindles, means for maintaining the said engagement during the coiling operation, and means for the simultaneous reciprocation of all the spindles, as set forth.

In testimony whereof I have signed my name to this specification.

JOHN EDWARD POINTON.